United States Patent [19]

Simpson

[11] Patent Number: 4,509,189
[45] Date of Patent: Apr. 2, 1985

[54] SOUND LEVEL INDICATING DEVICES
[76] Inventor: Buddy B. Simpson, Rte. 1 Box 320-A, Woodland, Ala. 36280
[21] Appl. No.: 502,195
[22] Filed: Jun. 8, 1983
[51] Int. Cl.³ .................. G08B 5/36; G08B 23/00; G01H 3/12
[52] U.S. Cl. .................................. 381/56; 73/646
[58] Field of Search .............. 73/645, 646, 647, 648; 381/56, 57, 71, 73, 94; 434/185

[56] References Cited
U.S. PATENT DOCUMENTS

| 3,304,368 | 2/1967 | Ford et al. | 381/57 |
| 3,440,349 | 4/1969 | Gibbs | |
| 3,615,162 | 10/1971 | Barber | 73/647 |
| 4,346,374 | 8/1982 | Groff | 381/56 X |

FOREIGN PATENT DOCUMENTS 2486236  1/1982  France ................ 73/647

OTHER PUBLICATIONS

"SOUNDEK: A Sound Monitoring Device", 2 pages of sales literature; Environmental Design Planners, Inc., Tampa, Fla.
"Lunchroom Traffic Lights", *The Tampa Tribune*, Section B, p. 1B, Dec. 27, 1980.

Primary Examiner—Keith E. George

[57] ABSTRACT

A sound level indicating device specifically designed for use by educators to use in teaching students the art of self-discipline when students are arranged in large groups in a large area with means for: (1) detecting noise; (2) distinguishing between noises of different decibel levels; (3) distinguishing between noises of different lengths of time; (4) ignoring isolated sounds of excessive decibel level which may occur in the midst of a general noise level; (5) switching a plurality of SPDT relays; (6) giving visual signals to indicate the rise and/or fall of noise levels in reference to a predetermined decibel level.

3 Claims, 3 Drawing Figures

SOUND LEVEL INDICATING DEVICES

BACKGROUND OF THE INVENTION

Educators, and more specifically principals and adminstrators of schools which operate a lunchroom for students have expressed a desire to have a sound level indicating device to use in teaching students the art of self-discipline.

Educators have attempted to use devices disclosed in prior art, but such devices have many drawbacks, the most notable being that most devices in the prior art give an audible alarm when noise exceeds a predetermined decibel level of unacceptability, however, that predetermined decibel level of unacceptability tends to exceed the decibel level of the alarm used in devices to indicate the presence of excessive noise levels. The solution to this problem is not to couple an alarm of a higher decibel level capacity to indicating devices since that would add to the noise pollution level, which is precisely what the educators wish to reduce and to control. A more desirable solution is to have a sound level indicator which gives a visible signal when noise levels exceed a predetermined decibel level of unacceptability.

The device which educators have specifically described as being desirable is one which gives visiual indications in the same fashion as a traffic light wherein the green signal indicates an acceptable noise level, a switch to yellow indicates that noise is becoming excessive, and a red light would indicate noise being monitored is of a decibel level at or beyond a predetermined level of unacceptability.

While numerous sound level indicating devices have been disclosed in the prior art, none of them are specifically designed, nor are they readily adaptable to be used in the fashion which educators wish to employ a sound level indicating device. The drawbacks to existing devices are numerous:

One drawback to existing sound level indicators in general is, they are not designed to be used for teaching students the art of self-discipline.

Of devices which were designed to be used in teaching the art of self-discipline to students, many drawbacks exist:

(1) One such drawback is that devices of the prior art use audible alarms to signal students when noise exceeds a predetermined level of unacceptability;

(2) Another drawback in devices of the prior art which do utilize a visible signal to indicate noise above a predetermined level of unacceptability is, the visible signal is given by small LED's as digital readouts, or as ripple effects in a plurality of ten (10) lamps, and are not readily noticeable by a large group of people in a large room.

(3) Another drawback in prior art device incorporating visible signals is, the devices are designed to respond to sounds created by a single individual;

(4) Another drawback in prior art devices incorporating visible signals is, the devices are designed to respond to isolated occurrences of noise;

(5) Another drawback in prior art devices incorporating visible signals is, the devices are designed to respond when noise produced by students is of a decibel level which has been predetermined as being of insufficient loudness.

The purpose of the present invention is to provide educators with a device specifically designed for assisting in teaching students the art of self-discipline.

Another purpose of the present invention is provide educators with a sound level indicating device which gives its alarm in a visible manner.

Another purpose of the present invention is to provide a sound level indicating device which gives a visible signal by utilizing lamps which require alternating current and can vary in wattage to provide a signal which will be readily noticeable by a large group of people in a large room.

Another purpose of the present invention is to provide a sound level indicating device which monitors noise created by a large group of people.

Another purpose of the present invention is to provide a sound level indicating device which responds to noise when said noise is in excess of a predetermined time length with said time being measured by the duration of the noise.

Another purpose of the present invention is to provide a sound level indicating device which ignores sounds of a duration shorter than a predetermined length of time.

Another purpose of the present invention is to provide a sound level indicating device which gives a visible signal to indicate when noise is at or below a predetermined decibel level of acceptability.

Another purpose of the present invention is to provide a sound level indicating device which gives a visible signal to indicate when noise is in excess of a predetermined decibel level of acceptability, but not in excess of a predetermined decibel level of unacceptability.

Another purpose of the present invention is to provide a sound level indicating device which gives a visible signal to indicate when noise is in excess of a predetermined decibel level of unacceptability.

DESCRIPTION OF THE PREFERRED EMBODIMENT

Figure 1:
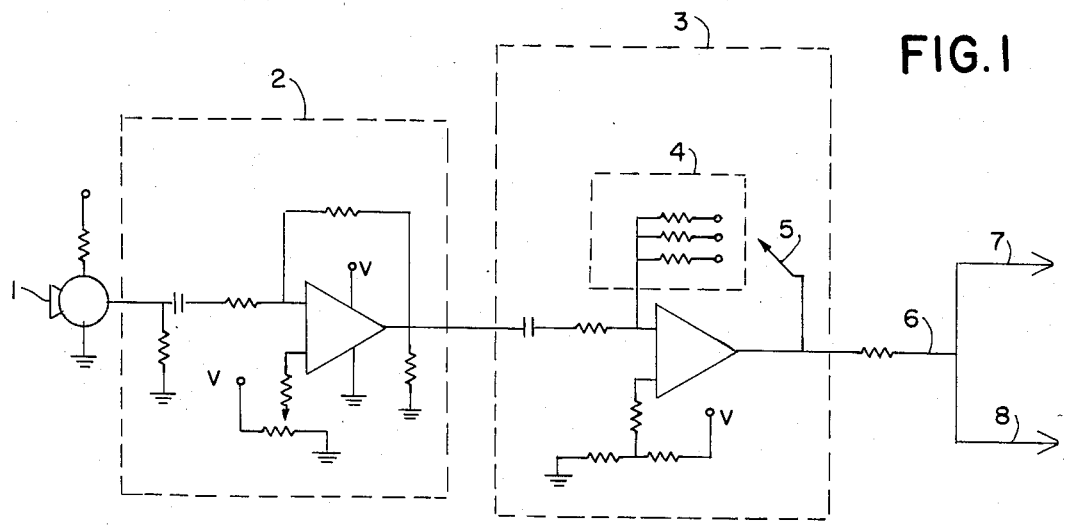
FIG. 1 is a schematic diagram of a circuit for detecting noise, for converting noise signals to a voltage potential, for amplifying said signals giving them both fixed and adjustable gain, for allowing the operator to predetermine unacceptable decibel levels of noise, and for sending said signals to a plurality of threshold detector circuits.

FIG. 1 shows a microphone 1 for detecting sound waves and converting said sound waves to a voltage potential. Said microphone 1, by means of an appropriate RC circuit, is connected to a first stage simple inverting operational amplifier 2 where the voltage potential from said microphone 1 is given a fixed gain. Said first stage simple inverting operational amplifier 2, by means of an appropriate RC circuit, is connected to a second stage simple inverting operational amplifier 3 which gives the signal from said first stage simple inverting operational amplifier 2 adjustable gain by means of an array of appropriate resistors 4 which are connected to a rotary switch 5 to allow the operator to select different decibel levels of noise to be indicated as acceptable, excessive, and/or unacceptable.

The amplified signal from said second stage simple inverting operational amplifier 3 is transmitted over a line 6 which divides into two lines 7 & 8 to connect to two separate series of cascading threshold detector circuits.

Figure 2:
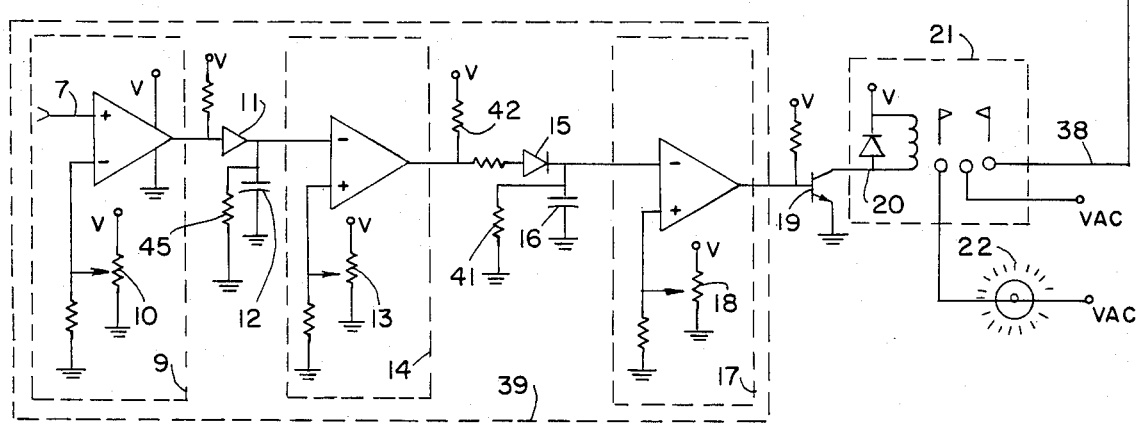
FIG. 2 is a schematic diagram of a circuit in which the device is given the ability to select different decibel levels of sensitivity, to distinguish between noises of different decibel levels, to distinguish between noises of different time lengths, to distinguish between noises of divergent decibel levels which occur simultaneously with the average noise level being detected provided said divergent decibel levels of noise are of shorter duration than a predetermined time length, to trigger a transistor which open and closes a SPDT relay, to turn on a light which indicates noise has exceeded a predetermined decibel level of unacceptability, and to turn off lights which indicate that noise is still within an acceptable decibel level.

FIG. 2 shows a cascading series of threshold detector circuits constructed by using a LM 339 quad-comparator.

The first threshold detector circuit 9 utilizes one of the four independent voltage comparators of said LM 339, and by means of a dividing line 6 & 7 connects the positive input pin of said comparator to said second stage simple inverting operational amplifier (FIG. 1, 3). Connecting a potentiometer 10 to the negative input pin of said comparator gives means for an adjustable internal bias which allows the setting of various threshold levels, each of which determine the decibel level of noise which must be detected by said microphone (FIG. 1, 1) in order to produce a voltage which equals and/or exceeds the threshold level set by said potentiometer. Thus the first threshold detector circuit 9 gives the device means for distinguishing between noises of different decibel levels, and allows for changing the sensitivity of the device in predetermining an unacceptable decibel level of noise. When the output pin of said first threshold detector circuit 9 conducts, it converts the erratic signal from said second stage simple inverting operational amplifier (FIG. 1, 3) into a square wave.

By means of a filter consisting of a diode 11 and an appropriate RC circuit, said first threshold detector circuit 9 is connected to the negative input pin of a second threshold detector circuit 14 which utilizes one of the four independent voltage comparators of said LM 339. When the output pin of said first threshold detector circuit 9 conducts, it goes high and current is passed through said diode 11 and stored in a capacitor 12 which has a bleeder resistor 45 to drain off desired amounts of voltage while the capacitor is charging to a level to equal and/or exceed the threshold level set by said second threshold detector circuit 14. Connecting a potentiometer 13 to the positive input pin of said voltage comparator gives means for an adjustable internal bias which allows the setting of various threshold levels to determine the length of time a predetermined decibel level of noise must be detected by said microphone in order for said capacitor 12 to be charged to a level to equal and/or exceed the threshold level. Thus said second threshold detector circuit 14 gives the device means for distinguishing between noises of different lengths of time so that the device can give a signal to indicate the average noise level being detected by said microphone, and to sustain said signal for as long a time as that average level of noise continues to be detected by said microphone.

By means of a filter consisting of a diode 15 and an appropriate RC circuit, said second threshold detector circuit 14 is connected to the negative input pin of a third threshold detector circuit 17 which utilizes one of the four independent voltage comparators of said LM 339. Connecting a potentiometer 18 to the positive input pin of said voltage comparator gives means for an adjustable internal bias which allows the setting of various threshold levels and determines the amount of charge which can be held on a capacitor 16. By connecting a resistor 42 to the power supply, voltage can be passed through a diode 15 to create said charge on the capacitor 16. When the threshold level set on said second threshold detector circuit 14 is reached, the output pin goes low so that the resistor 42 cannot continue to charge said capacitor 16. The charge being held on said capacitor 16 is blocked from returning to said second threshold detector circuit 14 by means of a diode 15, and is drained off through a bleeder resistor 41. When the charge on said capacitor 16 is drained off, the output pin of said third threshold detector circuit 17 conducts. Thus said third threshold detector circuit 17 gives the device means to distinguish between the average noise level being detected by said microphone, and noises of divergent decibel levels which occur simultaneously, provided that said divergent decibel levels are of shorter duration than the predetermined length of noises selected by the second threshold detector circuit 14.

When the third threshold detector circuit 17 conducts, the output pin goes high and switches a transistor 19 which is connected to a SPDT relay 21. When said transistor 19 is triggered, it allows the ground pin 20 of a SPDT relay 21 to go low thereby causing said relay to switch 120 and/or 240 volts of alternating current from a line 38 (which connects with another SPDT relay 35) to an alternating current lamp bulb 22 which then glows to indicate that noise has exceeded a predetermined level of unacceptability.

Figure 3:
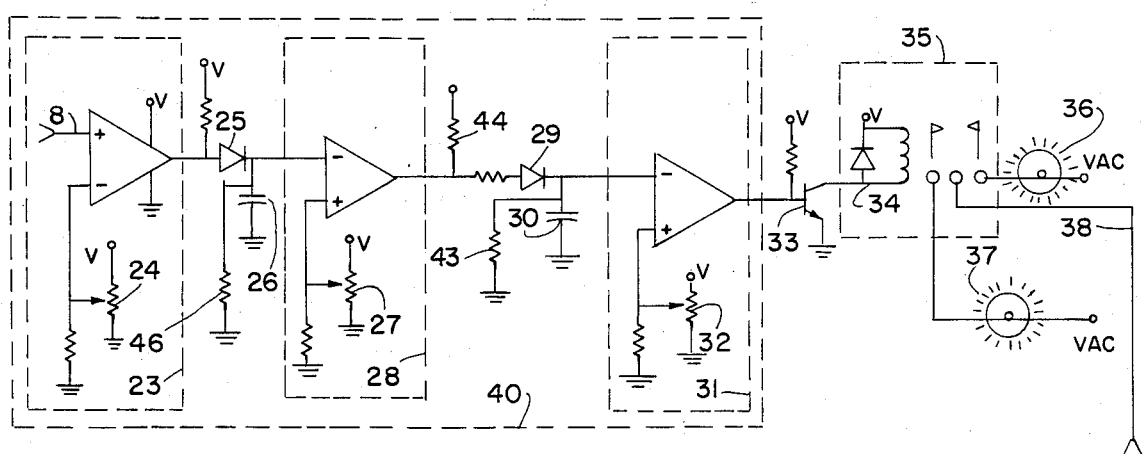
FIG. 3 is a schematic diagram of a circuit in which the device is given the ability to select different decibel levels of sensitivity, to distinguish between noises of different decibel levels, to distinguish between noises of different time lengths, to distinguish between divergent decibel levels of noise which occur simultaneously with the average noise level being detected provided said divergent decibel levels of noise are of shorter duration than a predetermined time length, to trigger a transistor which opens and closes a SPDT relay, to turn on a light which indicates noise is exceeding a predetermined decibel level of acceptability but has not yet reached a predetermined decibel level of unacceptability and to turn off a light which indicates that noise levels are within a predetermined decibel level of acceptability.

FIG. 3 shows a cascading series of threshold detector circuits constructed by using a LM 339 quad-comparator.

The first threshold detector circuit 23 utilizes one of the four independent voltage comparators of said LM 339, and by means of a dividing line 6 & 8 connects the positive input pin of said comparator to said second stage simple inverting operational amplifier (FIG. 1, 3). Connecting a potentiometer 24 to the negative input pin of said comparator gives means for an adjustable internal bias which allows the setting of various threshold levels, each of which determines the decibel level of noise which must be detected by said microphone (FIG. 1, 1) in order to produce a voltage which equals and/or exceeds the threshold level set by said potentiometer 24. Thus the first threshold detector circuit 23 gives the device means for distinguishing between noises of different decibel levels, and allows for changing the sensitivity of the device in predetermining a decibel level of noise which is in excess of a decibel level of noise which has been predetermined as being acceptable. When the output pin of said first threshold detector circuit 23 conducts, it converts the erratic signal from said second stage simple inverting operational amplifier (FIG. 1, 3) to a square wave.

By means of a filter consisting of a diode 25 and an appropriate RC circuit, said first threshold detector circuit 23 is connected to the negative input pin of a second threshold detector circuit 28 which utilizes one of the four independent voltage comparators of said LM 339. When the output pin of said first threshold detector circuit conducts, it goes high and current is passed through said diode 25 and stored in a capacitor 26 which has a bleeder resistor 26 to drain off desired amounts of voltage while the capacitor is charging to a level to equal and/or exceed the threshold level set by said second threshold detector circuit 28. Connecting a potentiometer 27 to the positive input pin of said voltage comparator gives means for an adjustable internal bias which allows the setting of various threshold levels to determine the length of time a predetermined decibel level of noise must be detected by said microphone in order for said capacitor 26 to be charged to a level to equal and/or exceed the threshold level. Thus said second threshold detector circuit 28 gives the device means for distinguishing between noises of different lengths of time so that the device can give a signal to indicate the average noise level being detected by said microphone, and to sustain said signal for as long a time as that average level of noise continues to be detected by said microphone.

By means of a filter consisting of a diode 29 and an appropriate RC circuit, said second threshold detector circuit 28 is connected to the negative input pin of a third threshold detector circuit 31 which utilizes one of the four independent voltage comparators of said LM 339. Connecting a potentiometer 32 to the positive input pin of said voltage comparator gives means for an adjustable internal bias which allows the setting of various threshold levels and determines the amount of charge which can be held on a capacitor 30. By connecting a resistor 44 to the power supply, voltage can be passed through a diode 29 to create said charge on the capacitor 30.

When the threshold level set on said second threshold detector circuit 28 is reached, the output pin goes low so that the resistor 44 cannot continue to charge said capacitor 30. The charge being held on said capacitor 30 is blocked from returning to said second threshold detector circuit 28 by means of a diode 29, and is drained off through a bleeder resistor 43. When the charge on said capacitor is drained off, the output pin of said third threshold detector circuit 31 conducts. Thus said third threshold detector circuit 31 gives the device means to distinguish between the average noise level being detected by said microphone, and noises of divergent decibel levels which occur simultaneously, provided that said divergent decibel levels of noise are of a shorter duration than the predetermined length of noises selected by the second threshold detector circuit 28.

When said third threshold detector circuit 31 conducts, the output pin goes high and switches a transistor 33 which is connected to a SPDT relay 35. And when said transistor is triggered, it allows the ground pin 34 of said SPDT relay 35 to go low thereby causing said relay to switch 120 and/or 240 volts of alternating current from an alternating lamp bulb 36 (which glows to indicate that the noise level being detected by said microphone is within an acceptable decibel level range) to another alternating lamp bulb 37, which then glows to indicate that the noise level being detected by said microphone is exceeding the acceptable decibel level, but has not yet reached the predetermined unacceptable decibel level of noise.

What is claimed is:

1. A sound level indicating device to give a visual signal automatically to indicate the decibel level of noise being detected, with said signal being sustained for the duration of the noise level being detected, and for changing the visual signal a multiplicity of times to indicate predetermined levels of noise as being acceptable or at higher levels with said device comprising in combination: a microphone for detecting noise and generating a voltage potential in response to the detection of said noise; a first stage audio amplifier coupled with said microphone by means of an RC coupling for amplifying the output of said microphone with a fixed gain; and a second stage audio amplifier coupled with said first stage audio amplifier by means of an RC coupling for amplifying the output of said first stage audio amplifier with adjustable gain by means of an array of resistors and a rotary switch to allow the operator to choose different decibel levels of noise as being acceptable; a first series of cascading threshold detector circuits comprised of: a first threshold detector circuit coupled to an output of said second stage audio amplifier for converting the erratic signal from said second stage audio amplifier into a square wave indicative of when the level of noise exceeds a threshold value said first threshold detector including variable threshold setting means for changing the sensitivity of said device when predetermined the decibel level of noise to be indicated as acceptable; a second threshold detector circuit coupled to said first threshold detector circuit by means of a filter comprised of a diode and an appropriate RC timing circuit the second threshold detector gives a sustained signal to indicate detection of a decibel level of noise by said microphone which has been predetermined to be acceptable, the second threshold detector alternately gives a signal indicating detection of a noise level above the acceptable level for at least a set period of time; a third threshold detector circuit coupled to said second threshold detector circuit by means of a second filter comprised of a second diode and an appropriate second RC timing circuit, the third threshold detector gives a sustained signal indicating an acceptable noise level unless the signal from the second threshold detector indicating a noise level above the acceptable level persists for an additional set period of time; an SPDT relay; a transistor coupled with said third threshold detector circuit for switching the SPDT relay in response to the sustained signal from the third threshold detector, to supply A/C current to a lamp bulb which glows to indicate the noise level being detected by said microphone is within a decibel level which has been predetermined to be acceptable.

2. The device defined in claim 1 with the first series of cascading threshold detector circuits alternatley changing the visual signal to indicate the detection of an excessive decibel level of noise.

3. The device defined in claim 1 with a second series of cascading threshold detector circuits for changing the visual signal to indicate detection of an unacceptable decibel level of noise.

* * * * *